United States Patent
Pech et al.

(10) Patent No.: US 9,657,586 B2
(45) Date of Patent: May 23, 2017

(54) TURBOMACHINE STARTER OIL FILTRATION SYSTEM

(71) Applicant: Hamilton Sundstrand Corporation, Charlotte, NC (US)

(72) Inventors: John T. Pech, Canton, CT (US); Jeffrey M. Makulec, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 442 days.

(21) Appl. No.: 14/260,790

(22) Filed: Apr. 24, 2014

(65) Prior Publication Data

US 2015/0308283 A1    Oct. 29, 2015

(51) Int. Cl.
| | | |
|---|---|---|
| *F01D 15/12* | (2006.01) | |
| *F01D 19/00* | (2006.01) | |
| *F01D 25/32* | (2006.01) | |
| *F01D 25/18* | (2006.01) | |
| *B01D 35/00* | (2006.01) | |
| *B23P 15/14* | (2006.01) | |
| *F02C 7/277* | (2006.01) | |

(52) U.S. Cl.
CPC ............ *F01D 19/00* (2013.01); *B01D 35/005* (2013.01); *B23P 15/14* (2013.01); *F01D 25/18* (2013.01); *F01D 25/32* (2013.01); *F02C 7/277* (2013.01); *F05D 2220/50* (2013.01); *F05D 2260/85* (2013.01); *F05D 2260/98* (2013.01)

(58) Field of Classification Search
CPC ....... B01D 35/005; B23P 15/14; F01D 15/12; F01D 19/00; F01D 25/18; F01D 25/32; F02C 7/277; F02C 7/32; F05D 2220/30; F05D 2220/50; F05D 2260/4031; F05D 2260/85; F05D 2260/98

See application file for complete search history.

(56) References Cited

U.S. PATENT DOCUMENTS

| | | | | |
|---|---|---|---|---|
| 4,779,413 | A * | 10/1988 | Mouton ................. | F02C 7/277 184/6.11 |
| 5,245,820 | A * | 9/1993 | Zalewski ................ | F01D 25/18 60/39.08 |
| 5,839,327 | A * | 11/1998 | Gage ..................... | F16H 57/0412 184/11.1 |
| 7,014,419 | B2 * | 3/2006 | Farnsworth ........... | F01D 25/183 137/855 |
| 7,186,081 | B2 * | 3/2007 | Giesler ................. | F01D 25/183 415/122.1 |
| 2001/0003242 | A1 * | 6/2001 | Takamatsu ............. | F01D 25/28 60/802 |
| 2003/0145602 | A1 * | 8/2003 | Lane ..................... | F01D 25/18 60/787 |

(Continued)

FOREIGN PATENT DOCUMENTS

GB        2144804 A  *  3/1985  ............ F01D 25/18

*Primary Examiner* — Jesse Bogue
(74) *Attorney, Agent, or Firm* — Locke Lord LLP; Joshua L. Jones; Daniel J. Fiorello

(57) ABSTRACT

A starter configured for use with a turbomachine includes a housing defining a cavity, a transmission operative to convert an airflow into rotational motion for starting an engine, wherein the cavity is configured to hold a quantity of starter oil for lubricating at least a portion of the transmission, and an oil filter disposed in fluid communication with the starter oil.

10 Claims, 2 Drawing Sheets

(56) References Cited

U.S. PATENT DOCUMENTS

| | | | |
|---|---|---|---|
| 2006/0056958 A1* | 3/2006 | Gaines | F02C 7/32 |
| | | | 415/115 |
| 2008/0127774 A1* | 6/2008 | Frost | F02C 7/275 |
| | | | 74/606 R |
| 2008/0128208 A1* | 6/2008 | Ideshio | B60K 6/52 |
| | | | 184/6 |
| 2015/0300255 A1* | 10/2015 | Gallet | F16H 57/0423 |
| | | | 475/159 |
| 2015/0361829 A1* | 12/2015 | McCune | F01D 25/18 |
| | | | 415/122.1 |

* cited by examiner

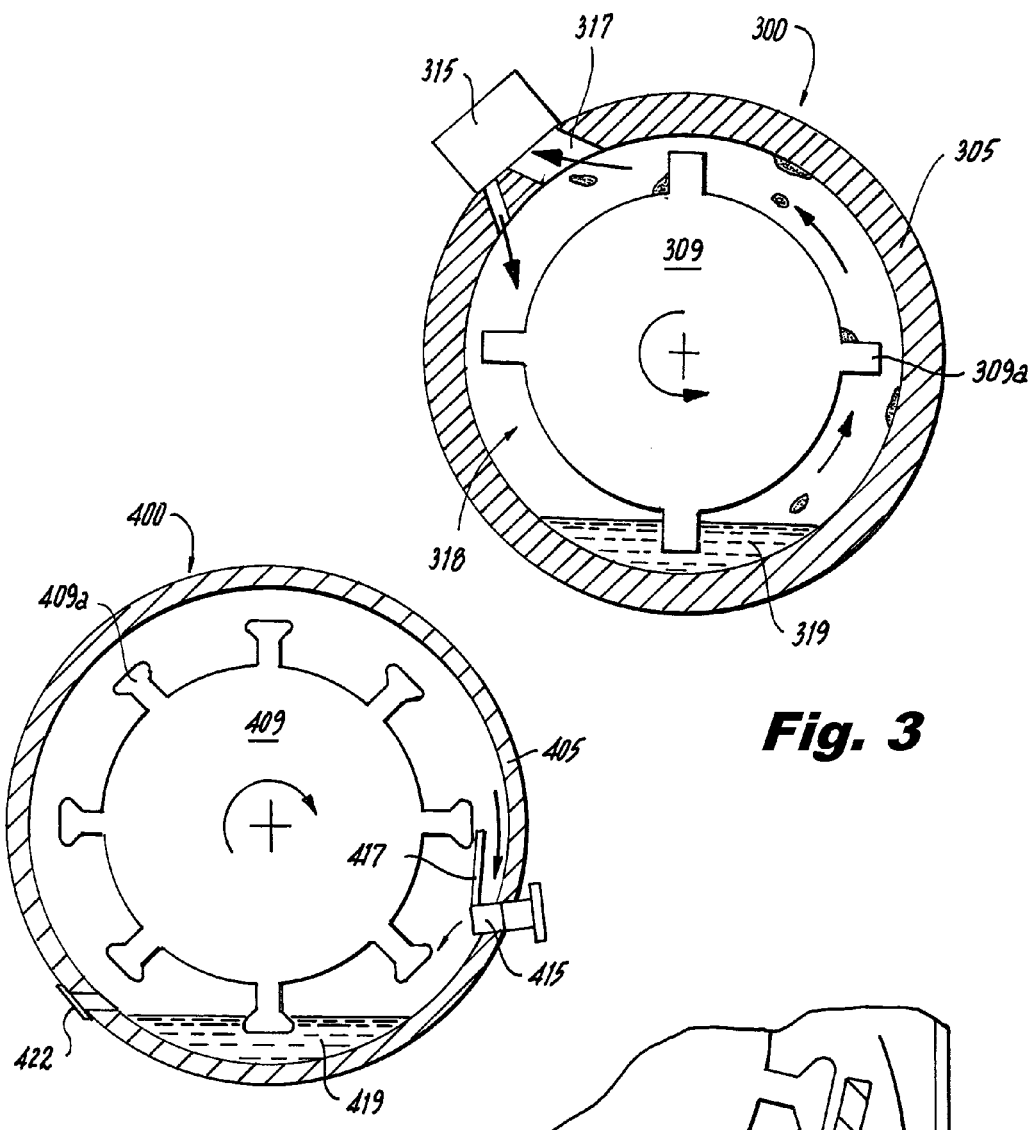
Fig. 3
Fig. 4
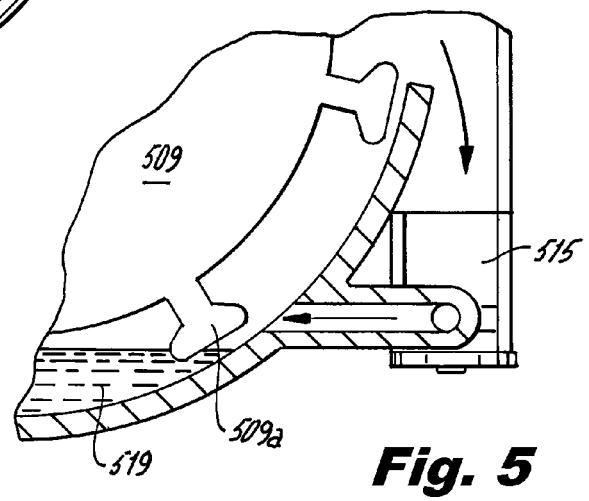
Fig. 5

TURBOMACHINE STARTER OIL FILTRATION SYSTEM

BACKGROUND

1. Field

The present disclosure relates to turbomachines, more specifically starters for turbomachines.

2. Description of Related Art

Some turbomachine starting systems can start a turbomachine cycle by accepting an airflow or exhaust flow from an auxiliary power unit and converting this airflow into rotational motion. The turbomachine is connected to the starter such that the rotation of the starter causes the shaft of the turbomachine to rotate.

Such a starter can include lubricating starter oil within the housing thereof such that the mechanics within the starter can be lubricated. Interaction of the oil and the mechanics within the starter leads to dirty oil which can result in damage to the starter. As a precaution, the starter must be serviced after a certain amount usage to check and/or replace the oil in the starter. Such conventional methods and systems have generally been considered satisfactory for their intended purpose. However, there is still a need in the art for starter systems having longer service intervals. The present disclosure provides a solution for this need.

SUMMARY

In at least one aspect of this disclosure, a starter configured for use with a turbomachine includes a housing defining a cavity, a transmission operative to convert an airflow into rotational motion for starting an engine, wherein the cavity is configured to hold a quantity of starter oil for lubricating at least a portion of the transmission, and an oil filter disposed in fluid communication with the starter oil.

In certain embodiments, the starter further includes an oil pressurization system configured to create a pressurized flow of the starter oil or otherwise move the oil to the filter in any suitable manner. The transmission can include a gear having gear teeth that are configured to pressurize or move the starter oil. The gear teeth can include an airfoil shape or any other suitable shape.

In certain embodiments, the oil filter can be gravity fed. The oil filter can include an externally accessible oil filter configured to be removably attached to the housing from outside the housing. In certain embodiments, the oil filter is a spin-on oil filter.

In certain embodiments, the gear can be a ring gear and the gear teeth can be speed pickup teeth disposed on the outer diameter of the ring gear.

In certain embodiments, a scoop is disposed within the housing to skim oil from the ring gear as it rotates to pass the oil to the filter.

In certain embodiments, the gear teeth are optimized to maximize oil flow and minimize rotational energy draw from the starter.

In at least one aspect of this disclosure, a method for filtering oil in a starter includes introducing starter oil from a cavity defined within the starter to flow into an oil filter disposed in fluid communication with the starter oil, filtering the starter oil through the oil filter, and outputting the filtered starter oil back into the cavity.

In certain embodiments, introducing starter oil can include pressurizing the oil to flow through the oil filter. Introducing starter oil can include moving oil to an oil filter location using a rotating gear disposed in communication with the starter oil via viscous friction.

In certain embodiments, introducing starter oil can include using gear teeth of a gear to carry the starter oil to an oil filter location. Introducing starter oil can include using gear teeth of a gear disposed within the starter to pressurize the oil.

In at least one aspect of this disclosure, a method includes forming a gear for a turbomachine starter, and disposing gear teeth on the gear, wherein the gear teeth are shaped to include an airfoil shape. The method can further include optimizing the gear teeth to maximize oil flow and minimize rotational energy draw from the starter.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 3 is a cross-sectional, end elevation view of another example embodiment of a starter in accordance with this disclosure, showing a gravity fed oil filtration system;

FIG. 4 is a cross-sectional, end elevation view of another example embodiment of a starter in accordance with this disclosure, showing a horizontal housing-scooped oil filtration system; and FIG. 5 is a cross-sectional, end elevation view of another example embodiment of a starter in accordance with this disclosure, showing a vertical housing-scooped oil filtration system.

DETAILED DESCRIPTION

Figure 1:
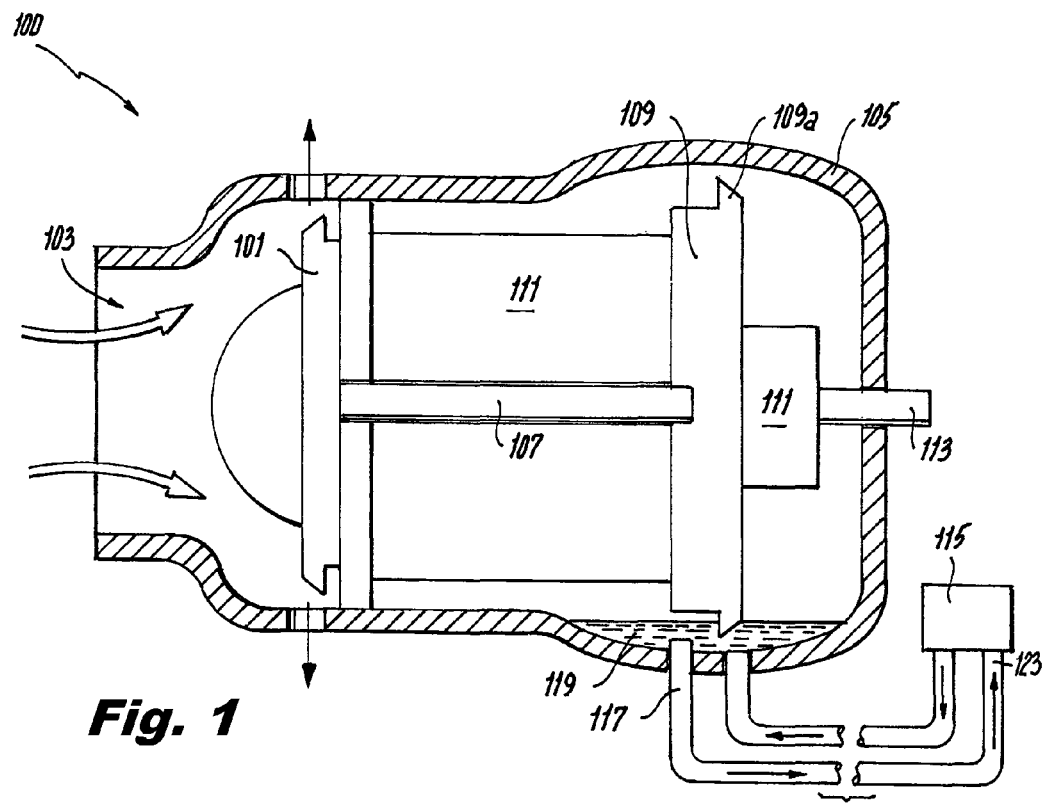
FIG. 1 is a cross-sectional, side-elevation view of portions of a starter in accordance with this disclosure, showing an oil filtration system.
Figure 2:
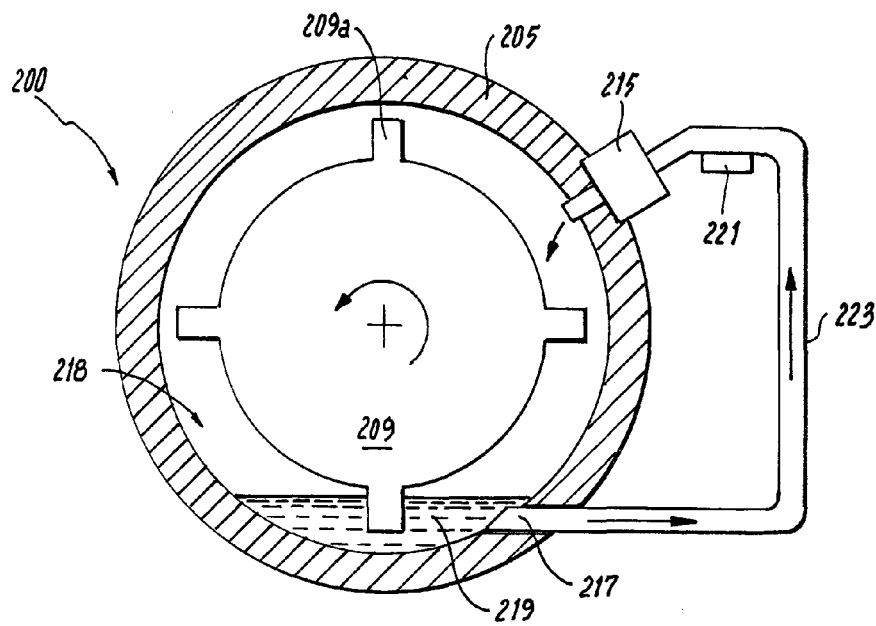
FIG. 2 is a cross-sectional, end elevation view of another example embodiment of a starter in accordance with this disclosure, showing a side fed oil filtration system.

Reference will now be made to the drawings wherein like reference numerals identify similar structural features or aspects of the subject disclosure. For purposes of explanation and illustration, and not limitation, a cross-sectional view of portions of an embodiment of a starter in accordance with the disclosure is shown in FIG. 1 and is designated generally by reference character 100. Other embodiments of a starter are shown in FIGS. 2 and 3. The devices, systems, and methods described herein can be used, for example, to allow for greater longevity between service intervals of a starter used to start an engine such as a turbomachine.

In at least one aspect of this disclosure, referring to FIG. 1, a starter 100 configured for use with a turbomachine includes a housing 105 defining a cavity 118, a turbine-assembly (e.g., portions 101 and 107), a transmission (e.g., portions 109, 111, and 113) operative to convert an airflow into rotational motion for starting an engine, and an oil filter 115 disposed in fluid communication with a starter oil 115 disposed in the cavity 118.

The starter 100 can include a turbine 101 for converting fluid flow received from an inlet 103 to rotational energy.

The starter 100 can further include a shaft 107 connected to the turbine 101 and to one or more mechanical portions 111 within the housing 105. For example, the shaft 107 can be connected to a gear 109 (e.g., a ring gear) which can include gear teeth 109a. The gear teeth 109a may be any suitable gear teeth such as gear teeth configured to perform mechanical action, and/or can be configured for any other suitable purpose (e.g., rotational speed sensing of a ring gear). In some embodiments, the gear 109 may not include any gear teeth on the outer diameter thereof.

Gear 109 can be connected to any other suitable mechanical portions 111 and directly or indirectly to an output shaft 113 configured to link to an engine. In some embodiments, the air inlet 103 is configured to accept an airflow from an auxiliary power unit (APU) of an aircraft and the output shaft 113 is configured to attach to a turbomachine to start the turbomachine rotation.

In some embodiments, the starter 100 can include an oil pressurization system configured to create a pressurized flow of the starter oil 119 through the filter 115. The oil pressurization system can include any suitable pump or any other component configured to generate a fluid flow. In some embodiments, the transmission of starter 100 can include a gear 109 having gear teeth 109a as described herein that can be configured to pressurize the starter oil 119. In some embodiments, the gear teeth 109a can include an airfoil shape or any other suitable shape to create a fluid flow. In some embodiments, the gear teeth 109a can be optimized to maximize pressurization or circulation of the oil 119 and to minimize the energy draw from the rotation of the starter 100.

The gear 109 can be any suitable gear such as, but not limited to, a ring gear configured for determining rotational speed of the starter 100. In such an embodiment, the teeth 109a can be speed pickup teeth configured to be sensed by a speed sensor (e.g., disposed on the outer diameter of the ring gear). Other mechanical portion 111 or gears can be disposed on the inner diameter of gear 109 where the gear 109 is a ring gear. As disclosed above, the gear 109 may not include any gear teeth on the outer diameter thereof in some embodiments.

The oil filter 115 can alternatively or additionally be gravity fed. In some embodiments, the oil filter 115 can include an external accessible oil filter configured to be removably attached to the housing 105 from outside the housing. In some embodiments, the oil filter 115 can be a spin-on oil filter. The oil filter 115 can be located at any suitable location on or relative to the starter 100. A conduit 123 can be attached to the housing 105 and be in fluid communication with the oil 119 and the filter 115 such that oil can travel to and/or from the filter 115 from the housing 105.

A scoop 117 can be included in the housing 105 to guide fluid flow being pushed by the pressurization system (e.g., gear teeth 109a) into the oil filter 115. The scoop 117 can be integral with, defined by, or otherwise suitable disposed on the housing 105. As shown in the embodiment of FIG. 1, the scoop 117 can protrude into the cavity 118 to optimize collection of oil 119 being pushed by the gear teeth 109a.

As shown in the embodiment of FIG. 2, starter 200 includes a scoop 217 that can be integrated in and/or defined by the housing 205. The scoop 217 and/or housing 205 can be connected to a conduit 223 as described above to fluidly connect the cavity 218 and the filter 215 such that gear teach 209a of gear 209 can pressurize the oil 119 to travel to the oil filter 215.

In some embodiments, as shown in FIG. 3, starter 300 includes a scoop 317 can be located above the oil level such that it receives oil 319 via viscous and frictional whipping of the oil 319 by the gear 309 and/or gear teeth 309a, and directs the whipped oil to the filer 315. It is contemplated that the scoop 317 (or any other suitable scoop disclosed herein) can be positioned at any suitable portion of the starter 300.

In some embodiments, as shown in FIG. 2, the starter 200 can include a magnetic catch device 221 disposed at any suitable portion ahead of the oil filter 215 to collect ferrous particles out of the oil 219 before the oil 219 reaches the oil filter 215. The magnetic catch device 221 can be separately removable for examination and cleaning. The magnetic catch device 221 can include any suitable permanent magnet and/or electromagnet. This can prevent large particles from the starter 200 from reaching the filter 215 to increase the life of the oil filter 215.

As shown in the embodiments of FIGS. 4 and 5, stationary features on the housing 405, 505 can form a scoop 417, 517. FIG. 4 shows an embodiment of a horizontal arrangement of the filter 415 whereas FIG. 5 shows a vertical arrangement of the filter 515. The scoop 417, 517 can be positioned very close to the rotating gear 409, 509 so that it skims a portion of the windage flow to the filter 415, 515. Centrifugal effects can assist any debris in the oil 419, 519 to migrate radially outward where it is more likely to be skimmed into the filter area. Also, as shown in FIG. 4, the starter can include an oil fill port 422 configured to allow oil to be added to the starter without disassembly or removal of portions of the starter.

In at least one aspect of this disclosure, a method for filtering oil in a starter includes introducing starter oil from a cavity defined within the starter into an oil filter disposed in fluid communication with the starter oil, filtering the starter oil through the oil filter, and outputting the filtered starter oil back into the cavity.

Introducing starter oil can include pressurizing the oil to flow through the oil filter. In certain embodiments, introducing starter oil can include moving oil to an oil filter location with viscous friction using a rotating gear disposed in communication with the starter oil.

Introducing starter oil can include using gear teeth of a gear to carry the starter oil to an oil filter location. In certain embodiments, introducing starter oil can include using gear teeth of a gear disposed within the starter to pressurize the oil.

In at least one aspect of this disclosure, a method can include forming a gear for a turbomachine starter, and disposing gear teeth on the gear, wherein the gear teeth are shaped to include an airfoil shape.

The devices, methods, and systems of the present disclosure, as described above and shown in the drawings, provide for an engine starter (e.g., a pneumatic starter for a turbomachine) with superior properties including increased time between servicing intervals. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:
1. A starter configured for use with a turbomachine, comprising:
 a housing defining a cavity;
 a turbine and a transmission operative to convert an airflow into rotational motion for starting an engine, wherein the cavity is configured to hold a quantity of starter oil for lubricating at least a portion of the transmission; and an oil filter disposed in fluid communication with the starter oil, wherein the transmission includes a gear having gear teeth that are configured to pressurize or move the starter oil, and wherein the gear is a ring gear and the gear teeth are disposed on the outer diameter of the ring gear, and wherein a scoop is disposed within the housing to skim oil from the ring gear as it rotates to pass the oil to the filter.

2. The starter of claim 1, further comprising an oil pressurization system configured to create a pressurized flow of the starter oil or otherwise move the oil to the filter.

3. The starter of claim 1, wherein the gear teeth include an airfoil shape.

4. The starter of claim 1, wherein the oil filter is gravity fed.

5. The starter of claim 1, wherein the oil filter includes an external accessible oil filter configured to be removably attached to the housing from outside the housing.

6. The starter of claim 5, wherein the oil filter is a spin-on oil filter.

7. The starter of claim 1, wherein the gear teeth are optimized to maximize oil flow and minimize rotational energy draw from the starter.

8. A method for filtering oil in a starter, comprising:

introducing starter oil from a cavity defined within the starter to flow into an oil filter disposed in fluid communication with the starter oil;

filtering the starter oil through the oil filter; and outputting the filtered starter oil back into the cavity, wherein introducing starter oil includes using gear teeth of a gear to carry the starter oil to an oil filter location, wherein the gear teeth are on an outer diameter of a ring gear, and wherein introducing starter oil to flow into the oil filter includes moving the starter oil to a scoop in fluid communication with an oil filter location.

9. The method of claim 8, wherein introducing starter oil includes pressurizing the oil to flow through the oil filter.

10. The method of claim 8, wherein introducing starter oil includes using gear teeth of a gear disposed within the starter to pressurize the oil.

* * * * *